United States Patent
Habuchi et al.

(10) Patent No.: US 7,066,860 B2
(45) Date of Patent: Jun. 27, 2006

(54) DRIVING SYSTEM OF MOTOR VEHICLE

(75) Inventors: Ryoji Habuchi, Okazaki (JP); Hideki Yasue, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/617,045

(22) Filed: Jul. 11, 2003

(65) Prior Publication Data

US 2004/0014547 A1   Jan. 22, 2004

(30) Foreign Application Priority Data

Jul. 22, 2002   (JP) ............................. 2002-213024

(51) Int. Cl.
F16H 37/02   (2006.01)
F16H 61/662  (2006.01)
B60W 10/04   (2006.01)

(52) U.S. Cl. .................... 475/208; 477/44; 477/115

(58) Field of Classification Search .......... 475/208–10, 475/211, 219; 477/37, 43, 44, 115, 120
See application file for complete search history.

(56) References Cited

U.S. PATENT DOCUMENTS

| | | | | |
|---|---|---|---|---|
| 4,599,916 A | * | 7/1986 | Hirosawa | 475/210 |
| 4,627,308 A | * | 12/1986 | Moroto et al. | 475/210 |
| 4,630,504 A | | 12/1986 | Smirl | |
| 4,644,821 A | * | 2/1987 | Sumiyoshi et al. | 475/66 |
| 4,706,518 A | * | 11/1987 | Moroto et al. | 475/210 |
| 5,156,572 A | * | 10/1992 | Morishige | 477/43 |
| 5,860,888 A | * | 1/1999 | Lee | 475/210 |
| 6,368,247 B1 | * | 4/2002 | Kondo | 477/47 |
| 6,383,106 B1 | * | 5/2002 | Kashiwase | 475/5 |
| 6,440,037 B1 | * | 8/2002 | Takagi et al. | 477/37 |
| 6,443,871 B1 | * | 9/2002 | Taniguchi et al. | 477/44 |
| 6,450,917 B1 | * | 9/2002 | Taniguchi et al. | 477/49 |
| 6,459,978 B1 | * | 10/2002 | Taniguchi et al. | 477/39 |

FOREIGN PATENT DOCUMENTS

| | | |
|---|---|---|
| GB | 2144814 A | 3/1985 |
| JP | 2-173462 | 7/1990 |
| JP | 7-113400 | 12/1995 |
| JP | 11-182666 | 7/1999 |
| JP | 2002-327828 | 11/2002 |

* cited by examiner

*Primary Examiner*—Roger Pang
(74) *Attorney, Agent, or Firm*—Oblon, Spivak, McClelland, Maier & Neustadt, P.C.

(57) ABSTRACT

A driving system of a motor vehicle includes a driving power source that generates power, and a belt-and-pulley type continuously variable transmission that transmits the power received from the driving power source to drive wheels while changing a first speed of rotation of an input shaft thereof to a second speed of rotation of an output shaft thereof. The driving system further includes a speed changing mechanism provided between the driving power source and the continuously variable transmission so as to increase or reduce a speed of rotation of the driving power source during forward running of the vehicle.

4 Claims, 4 Drawing Sheets

|   | C1 | B1 |
|---|----|----|
| D |    | O  |
| N |    |    |
| R | O  |    |

|   | C2 | B2 |
|---|---|---|
| D | O |   |
| N |   |   |
| R |   | O | large in view of the torque variations. For these reasons,
DRIVING SYSTEM OF MOTOR VEHICLE

INCORPORATION BY REFERENCE

The disclosure of Japanese Patent Application No. 2002-213024 filed on Jul. 22, 2002, including the specification, drawings and abstract, is incorporated herein by reference in its entirety.

BACKGROUND OF THE INVENTION

1. Field of the Invention

The invention generally relates to a driving system of a motor vehicle, and in particular to a vehicular driving system that is easily applicable to a plurality of types of driving power sources having different output characteristics.

2. Description of Related Art

A driving system of a motor vehicle is known which is arranged to transmit rotary power generated by a driving power source to drive wheels while changing the speed of rotation by a belt-and-pulley type continuously variable transmission (CVT). Japanese Laid-open Patent Publication No. 11-182666 discloses one example of such a driving system in which a forward-drive/reverse-drive switching device of a planetary gear type is provided between the driving power source and the belt-and-pulley type continuously variable transmission. In operation, the forward-drive/reverse-drive switching device is placed in a selected one of a cut-off mode in which power transmission is cut off, a forward drive mode in which the vehicle runs forward, and a reverse drive mode in which the vehicle runs backward. In the forward drive mode that occurs most frequently, the forward-drive/reverse-drive switching device is rotated as a unit with a clutch thereof being engaged, for a reduction of power loss caused by rotation of meshing gears of the switching device.

In the meantime, a gasoline engine as one type of driving power source used in the vehicular driving system and a diesel engine as another type of driving power source exhibit different output characteristics, for example, provide the maximum power in different rotational speed regions. Generally, the diesel engine provides the maximum power at a lower rotational speed (for example, about 3000–4000 rpm) than the gasoline engine, and therefore the torque of the diesel engine is greater than that of the gasoline engine if the maximum power is at the same level. The increase in the torque makes it necessary to change the design of the belt-and-pulley type continuously variable transmission depending upon the output characteristics of the driving power source used in the system. For example, the size of the continuously variable transmission is increased so that a transmission belt of the CVT is clamped or gripped with an increased belt, clamping force. Also, the diesel engine experiences relatively large torque variations, which makes it necessary to set the belt clamping force to be relatively large in view of the torque variations. For these reasons, power loss in the driving system using the diesel engine as the driving power source is generally larger than that in the system using the gasoline engine.

SUMMARY OF THE INVENTION

It is an object of the invention to provide a driving system of a motor vehicle, in which a common belt-and-pulley type continuously variable transmission may be used along with a plurality of types of driving power sources having different output characteristics.

To accomplish the above object, there is provided according to the invention a driving system of a motor vehicle, comprising: (a) a driving power source that generates power, (b) a belt-and-pulley type continuously variable transmission that transmits the power received from the driving power source to a drive wheel while changing a first speed of rotation of an input shaft thereof to a second speed of rotation of an output shaft thereof, and (c) a speed changing mechanism provided between the driving power source and the continuously variable transmission so as to increase or reduce a speed of rotation of the driving power source during forward running of the vehicle.

In the driving system of the motor vehicle as described above, the speed changing mechanism is provided between the driving power source and the belt-and-pulley type continuously variable transmission, for increasing or reducing the speed of rotation of the driving power source during forward running of the vehicle. Thus, the speed changing mechanism is able to increase or reduce the torque of the driving power source and transmit the resulting torque to the continuously variable transmission. It is therefore possible to employ a common belt-and-pulley type continuously variable transmission for use with a plurality of types of driving power sources having different output characteristics, e.g., different torque characteristics, if, for example, the maximum torque applied to the continuously variable transmission is made substantially equal. This leads to a reduction in the overall manufacturing cost.

In one embodiment of the invention, the speed changing mechanism includes at least one planetary gear set, and has a forward-drive/reverse-drive switching function of establishing a selected one of a cut-off mode in which power transmission is cut off, a forward drive mode in which the vehicle runs forward, and a reverse drive mode in which the vehicle runs backward.

In the above-described driving system, the speed changing mechanism includes at least one planetary gear set and has a forward-drive/reverse-drive switching function. The driving system thus constructed is simpler in construction and is available at a reduced cost, as compared with the case where a speed changing device and a forward-drive/reverse-drive switching device are provided independently of or separately from each other.

In another embodiment of the invention, the driving power source is a diesel engine, and the speed changing mechanism transmits the power generated by the diesel engine to the continuously variable transmission while increasing a speed of rotation of the diesel engine during forward running of the vehicle.

In the driving system as described above, the driving power source is in the form of a diesel engine that generally outputs large torque at a lower rotational speed region than a gasoline engine. In the case where the diesel engine is used as the driving power source, the power of the diesel engine is transmitted to the belt-and-pulley type continuously variable transmission while the speed of rotation of the engine is increased by the speed changing mechanism, whereby the torque applied to the continuously variable transmission is reduced. Thus, the maximum torque transmitted from the diesel engine to the continuously variable transmission can be made equivalent to the maximum torque transmitted from the gasoline engine provided that the maximum power is substantially at the same level. Furthermore, the degree of variations in the torque is reduced as the torque is reduced with the increase in the rotational speed as described above. Thus, the belt-and-pulley type continuously variable transmission used in a diesel-engine vehicle can be made substantially as compact as that used in a gasoline-engine vehicle, and power loss due to large belt clamping force that would be otherwise required for the diesel-engine vehicle is reduced, thus assuring improved fuel economy.

While some degree of power loss due to, for example, rotation of meshing gears appears during the operation of the speed changing mechanism for increasing the rotational speed, such power loss is smaller than that arising in the case where a large-sized belt-and-pulley type continuously variable transmission is employed in accordance with the magnitude of torque generated by the diesel engine.

The belt-and-pulley type continuously variable transmission is applicable to a driving system of a motor vehicle in which a gasoline engine is installed as the driving power source, and may be designed so as to provide appropriate performance when the power of the gasoline engine is transmitted as it is to the continuously variable transmission. Also, the speed ratio at which the speed changing mechanism changes the speed of rotation of the driving power source may be determined so that the maximum torque applied from the diesel engine to the continuously variable transmission is substantially equal to or smaller than the maximum torque applied from the gasoline engine to the continuously variable transmission.

In the driving system as described above, the speed ratio (at which the speed is increased) of the speed changing mechanism is determined so that the maximum torque applied from the diesel engine to the continuously variable transmission is made substantially equal to or smaller than the maximum torque of the gasoline engine. Accordingly, the continuously variable transmission that is designed to provide appropriate performance when the power of the gasoline engine is transmitted to the transmission can be used without being modified in the diesel-engine vehicle.

As described above, the diesel engine may be preferably used as the driving power source of the vehicular driving system of the invention. However, other driving power sources, such as a gasoline engine and an electric motor, may also be employed. Furthermore, a hydraulic power transmitting device, such as a torque converter, for transmitting power through a fluid, for example, may be provided between the driving power source and the speed changing mechanism.

For example, the belt-and-pulley type continuously variable transmission may include a pair of variable pulleys whose groove widths are variable, and a transmission belt that is wound around the variable pulleys. In operation, the continuously variable transmission transmits the power by utilizing friction generated between the transmission belt and the variable pulleys. Also, the continuously variable transmission is arranged to control the belt clamping force produced by one of the variable pulleys by means of, for example, a hydraulic cylinder, so as to avoid belt slippage, and control the groove width of the other variable pulley by means of, for example, a hydraulic cylinder, so as to establish a desired speed ratio.

The speed changing mechanism may include at least one planetary gear set, as described above, but may be constructed in various other forms. For example, other gear type speed changing mechanisms, such as a two-axis type in which gears on two axes mesh with each other, may be employed. While the speed changing mechanism is preferably constructed such that switching between the forward drive mode and the reverse drive mode is effected by using a clutch or a brake, a forward-drive/reverse-drive switching device having a speed ratio of 1 during forward running of the vehicle may be provided apart from the speed changing mechanism. It is to be understood that the driving system according to the invention does not necessarily require a forward-drive/reverse-drive switching device.

While the speed changing mechanism of the driving system according to the invention is constructed so as to increase or reduce the speed of rotation at least during forward running of the vehicle that occurs most frequently, it may also be constructed such that the speed of rotation is increased or reduced during both forward running and backward running of the vehicle. Furthermore, where the diesel engine is used as a driving power source, the speed changing mechanism may be constructed so as to increase the speed of rotation of the driving power source (i.e., the diesel engine) during both forward running and backward running of the vehicle. In the case where the power of the driving power source is restricted during backward running of the vehicle, for example, the speed of rotation of the driving power source need not be necessarily increased or reduced during backward running, and the speed ratio to be established in the reverse drive mode, may be set to 1.

While the diesel engine is preferably used as the driving power source as described above, the invention is also applicable to a motor vehicle in which a gasoline engine is installed. Namely, in the vehicular driving system according to the invention, the driving power source may be a gasoline engine, and the speed changing mechanism may be arranged to transmit rotary power of the gasoline engine while reducing the speed of rotation during forward running of the vehicle. In this case, the belt-and-pulley type continuously variable transmission is applicable to a driving system of a vehicle in which a diesel engine is installed, and the transmission may be designed to provide appropriate performance when the power of the diesel engine is transmitted to the transmission without being changed. Furthermore, the speed reduction ratio of the speed changing mechanism may be determined such that the maximum torque applied from the gasoline engine to the continuously variable transmission is substantially equal to or smaller than the maximum torque applied from the diesel engine.

BRIEF DESCRIPTION OF THE DRAWINGS

The foregoing and/or further objects, features and advantages of the invention will become more apparent from the following description of a preferred embodiment with reference to the accompanying drawings, in which like numerals are used to represent like elements and wherein.

DETAILED DESCRIPTION OF PREFERRED EMBODIMENT

Figures 1A, 1B:
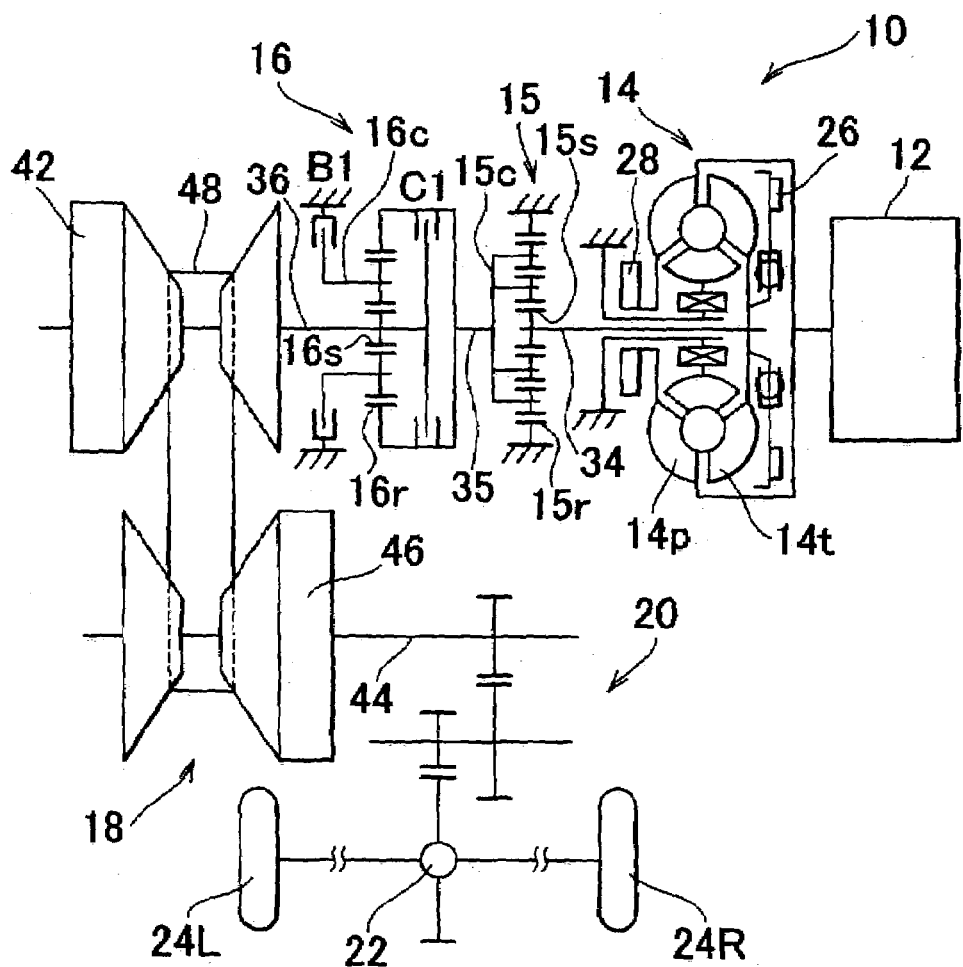
FIG. 1A is a schematic view showing a driving system of a motor vehicle to which the invention is applied.
FIG. 1B is an operation table of friction devices for switching the driving system between a forward drive mode and a reverse drive mode.

A preferred embodiment of the, invention will be described in detail with reference to the accompanying drawings.

FIG. 1 schematically shows a driving system 10 of a motor vehicle to which the invention is applied. The vehicular driving system 10, which is of a lateral type, is favorably employed in a FF (front-engine, front-drive) vehicle. The driving system 10 includes a diesel engine 12 as a driving power source for running the vehicle. The power of the diesel engine 12 is transmitted to a differential gear unit 22 via a torque converter 14 as a hydraulic power transmitting device, an auxiliary speed changing device 15, a forward-drive/reverse-drive switching device 16, a belt-and-pulley type continuously variable transmission (CVT) 18, and a speed reducing gear train 20. The power thus transmitted to the differential gear unit 22 is then distributed to right and left drive wheels 24R, 24L.

The torque converter 14 includes a pump impeller 14$p$ coupled to a crankshaft of the diesel engine 12, and a turbine wheel 14$t$ coupled to the auxiliary speed changing device 15 via a turbine shaft 34. The torque converter 14 is operable to transmit power from the diesel engine 12 to the auxiliary speed changing device 15 by using a fluid. The torque converter 14 further includes a lockup clutch 26 disposed between the pump impeller 14$p$ and the turbine wheel 14$t$. In operation, the pump impeller 14$p$ and the turbine wheel 14$t$ rotate together as a unit when the lockup clutch 26 is fully engaged. The pump impeller 14$p$ is provided with a mechanical oil pump 28 that operates to generate a hydraulic pressure so as to control shifting of the CVT 18, generate the belt clamping force of the CVT 18, or generate a hydraulic pressure for supplying lubricant to various portions of the driving system.

The auxiliary speed changing device 15 mainly consists of a double-pinion type planetary gear set, and includes a sun gear 15$s$, a ring gear 15$r$ and a carrier 15$c$. The turbine shaft 34 of the torque converter 14 is coupled integrally to the sun gear 15$s$, and the ring gear 15$r$ is coupled integrally to a housing of the driving system 10, while the carrier 15$c$ is coupled integrally to an intermediate shaft 35 which is in turn coupled to the forward-drive/reverse-drive switching device 16. In operation, the carrier 15$c$ outputs power received from the torque converter 14 to the forward-drive/reverse-drive switching device 16 via the intermediate shaft 35. The intermediate shaft 35 is rotated in a direction opposite to the rotating direction of the turbine shaft 34, at a speed ratio of $(1-\rho1)/\rho1$ where the gear ratio of the planetary gear set (15) is equal to $\rho1$. If $\rho1$ is larger than 0.5 (i.e., $0.5<\rho1$), the speed ratio is smaller than 1, and the intermediate shaft 35 is rotated at an increased speed in the reverse direction with respect to the turbine shaft 34, or with respect to the speed NE of rotation of the diesel engine 12. If $\rho1$ is equal to or smaller than 0.5 (i.e., $0.5 \geq \rho1$), the speed ratio is equal to or larger than 1, and the intermediate shaft 35 is rotated at an equal speed or a reduced speed in the reverse direction, with respect to the speed NE of rotation of the diesel engine 12.

The forward-drive/reverse-drive switching device 16 mainly consists of a single-pinion type planetary gear set, and includes a sun gear 16$s$, a ring gear 16$r$ and a carrier 16$c$. The intermediate shaft 35 is coupled integrally to the ring gear 16$r$, and an input shaft 36 of the CVT 18 is coupled integrally to the sun gear 16$s$, while the carrier 16$c$ is selectively fixed to the housing via a forward-drive brake B1. The ring gear 16$r$ and the sun gear 16$s$ are selectively coupled integrally to each other via a reverse-drive clutch C1. Each of the forward-drive brake B1 and the reverse-drive clutch C1 is a hydraulic friction device that is arranged to be frictionally engaged by a hydraulic cylinder. In operation, the brake B1 and the clutch C1 are selectively engaged or released when a hydraulic circuit is mechanically switched by a manual valve coupled to a shift lever (not shown). The shift lever has a "D" position for causing the vehicle to run forward, a "N" position for cutting off power transmission, and a "R" position for causing the vehicle to run backward. When the shift lever is placed in the "D" position, the forward-drive brake B1 is engaged and the reverse-drive clutch C1 is released as shown in FIG. 1B, so that the forward-drive/reverse-drive switching device 16 is placed in a forward drive mode in which the input shaft 36 of the CVT 18 is rotated in the direction opposite to that of the intermediate shaft 35, namely, in the same direction as that of the diesel engine 12, and the driving power for running the vehicle forward is transmitted to the CVT 18. The speed ratio of the switching device 16 in the forward drive mode is equal to $\rho2$ where $\rho2$ represents the gear ratio of the planetary gear set (16), and the input shaft 36 of the CVT 18 may be rotated at a speed higher than that of the intermediate shaft 35, depending upon the gear ratio $\rho2$.

When the shift lever is operated to the "R" position, the reverse-drive clutch C1 is engaged and the forward-drive brake B1 is released as shown in FIG. 1B, so that the forward-drive/reverse-drive switching device 16 is placed in a reverse drive mode in which the switching device 16 is rotated as a unit with the intermediate shaft 35. In the reverse drive mode, the input shaft 36 of the CVT 18 is rotated as a unit with the intermediate shaft 35 in the direction opposite to the rotating direction of the diesel engine 12, and the driving power for running the vehicle backward is transmitted to the CVT 18. The speed ratio of the switching device 16 in the reverse drive mode is equal to 1. When the shift lever is operated to the "N" position, the forward-drive brake B1 and the reverse-drive clutch C1 are both released, and the forward-drive/reverse-drive switching device 16 is placed in a neutral (power cut-off) mode in which power transmission is cut off.

Figure 2:
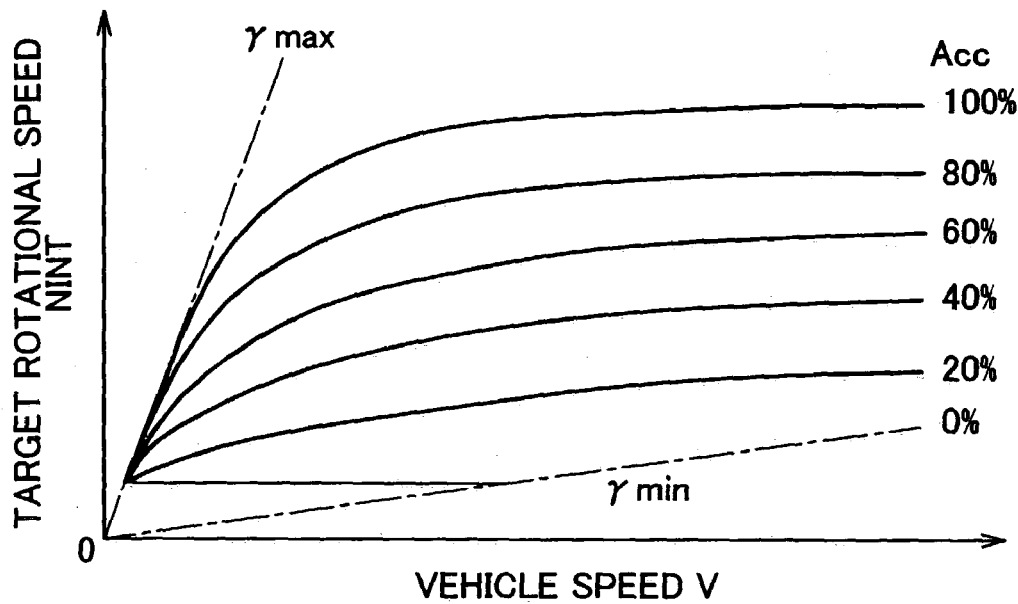
FIG. 2 is a view showing one example of a shift map of a belt-and-pulley type continuously variable transmission of the driving system of FIG. 1A.

The belt-and-pulley type CVT 18 includes an input-side variable pulley 42 disposed on the input shaft 36 and having a variable working diameter, an output-side variable pulley 46 disposed on an output shaft 44 and having a variable working diameter, and a transmission belt 48 that is wound around the variable pulleys 42, 46. The CVT 18 is operable to transmit power by utilizing frictional force generated between the variable pulleys 42, 46 and the transmission belt 48. Each of the variable pulleys 42, 46 has a V-shaped groove whose width is variable, and is provided with a hydraulic cylinder (not shown). By controlling a hydraulic pressure applied to the hydraulic cylinder of the input-side variable pulley 42, the widths of the V-shaped grooves of both of the variable pulleys 42, 46 are changed, and the engaging diameters (working diameters) of the transmission belt 48 are accordingly changed, so that the speed ratio γ (=rotational speed of the input shaft NIN/rotational speed of the output shaft NOUT) is continuously changed. For example, a target rotational speed NINT of the input shaft 36 is calculated from a predetermined shift map as shown in FIG. 2, which uses, as parameters, an amount of depression of the accelerator pedal Acc that represents a power requirement made by the driver, and the vehicle speed V. Then, the CVT 18 is controlled, more specifically, supply and discharge of a working fluid to and from the hydraulic cylinder of the input-side variable pulley 42 are controlled, depending upon a deviation of the actual rotational speed NIN of the input shaft 36 from the target rotational speed NINT, so that the actual input speed NIN becomes equal to the target input speed NINT. As is understood from the map of FIG. 2 that indicates shift conditions, the target rotational speed NINT is set so that the speed ratio γ increases as the vehicle speed V decreases and the amount of depression of the accelerator pedal Acc increases. The vehicle speed V corresponds to the output shaft rotational speed NOUT, and therefore the target rotational speed NINT as a target value of the input shaft speed NIN corresponds to the target speed ratio, which is determined in a range defined by the minimum speed ratio γmin and the maximum speed ratio γmax of the CVT 18.

Figure 3:
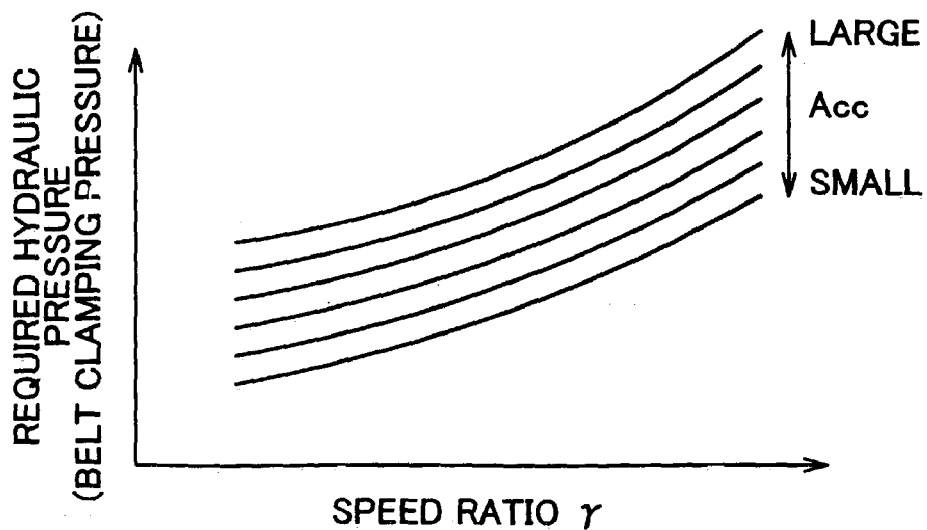
FIG. 3 is a view showing one example of a map indicating the required hydraulic pressure corresponding to the belt clamping force of the continuously variable transmission of FIG. 1.

On the other hand, a hydraulic pressure applied to the hydraulic cylinder of the output-side variable pulley 46 is regulated or controlled so as not to cause slippage of the transmission belt 48. For example, the hydraulic pressure applied to the hydraulic cylinder of the output-side variable pulley 46 is controlled according to a predetermined map as shown in FIG. 3, which indicates the required hydraulic pressure (corresponding to the belt clamping pressure) that is needed to avoid slippage of the belt. The map of FIG. 3 uses, as parameters, the amount of depression of the accelerator pedal Acc corresponding to transmitted torque, and the speed ratio γ. In accordance with the hydraulic pressure applied to the hydraulic cylinder of the output-side variable pulley 46, the belt clamping force, i.e., the frictional force generated between the variable pulleys 42, 46 and the transmission belt 48, is increased or reduced.

Figures 4A, 4B:
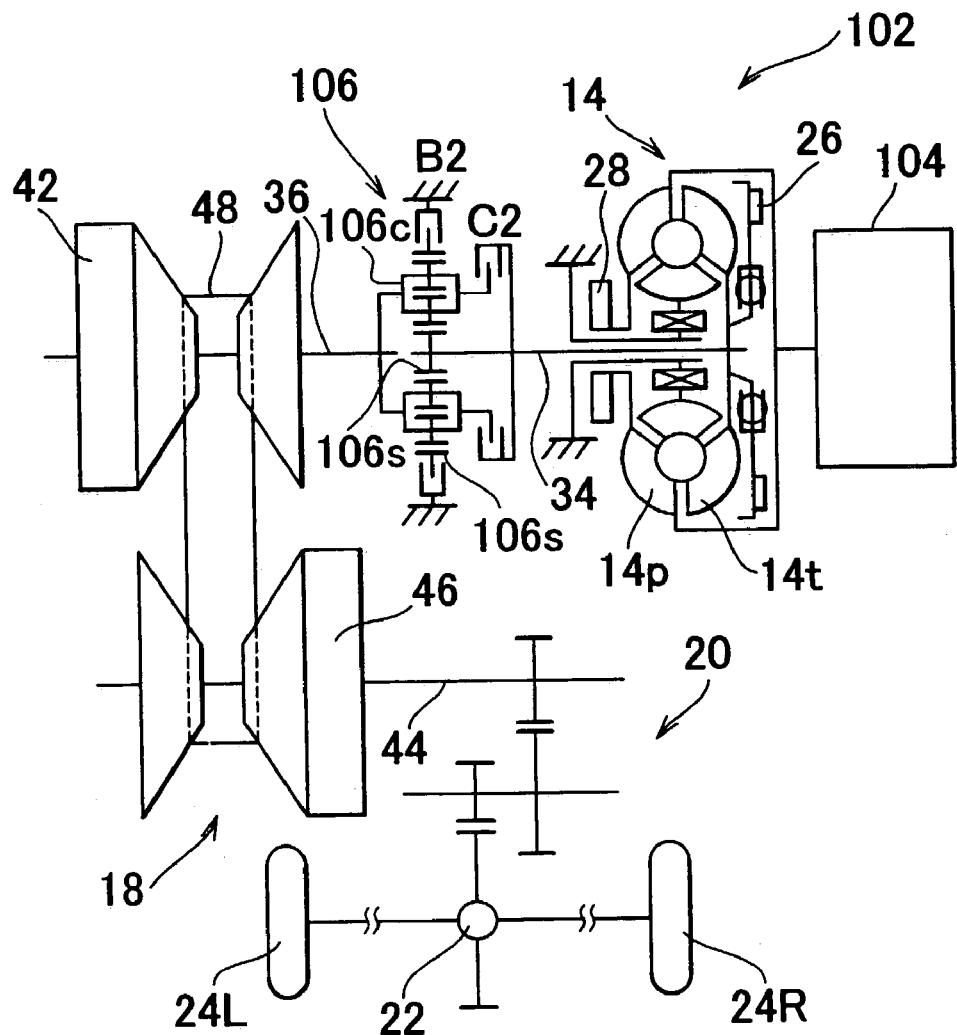
FIG. 4A is a schematic view showing a driving system of a motor vehicle which is provided with the same belt-and-pulley type continuously variable transmission as that of FIG. 1 and in which a gasoline engine is installed as a driving power source.
FIG. 4B is an operation table of friction devices for switching the driving system between a forward drive mode and a reverse drive mode.

The belt-and-pulley type CVT 18 as described above may be used in a driving system 102 of a motor vehicle in which a gasoline engine 104 is installed as a driving power source as shown in FIG. 4. Namely, the CVT 18 is applicable to both a diesel-engine vehicle and a gasoline-engine vehicle. In designing the CVT 18, the pressure-receiving areas of the hydraulic cylinders of the variable pulleys 42, 46 are determined so that the CVT 18 achieves appropriate performance in terms of the belt clamping force, or the like, when the power of the gasoline engine is transmitted to the CVT 18 as it is (i.e., without being changed) during forward running with a forward-drive clutch C2 of a forward-drive/reverse-drive switching device 106 being engaged. The forward-drive/reverse-drive switching device 106 mainly consists of a double-pinion type planetary gear set, and includes a sun gear 106s, a ring gear 106r and a carrier 106c. The turbine shaft 34 of the torque converter 14 is coupled integrally to the sun gear 106s, and the input shaft 36 of the CVT 18 is coupled integrally to the carrier 106c. Also, the carrier 106c and the sun gear 106s are selectively coupled to each other via the forward-drive clutch C2, and the ring gear 106r is selectively fixed to the housing via a reverse-drive brake B2. As shown in FIG. 4B, when the shift lever is operated to the "D" position, the forward-drive clutch C2 is engaged and the reverse-drive brake B2 is released, so that the forward-drive/reverse-drive switching device 106 is placed in a forward drive mode in which the switching device 106 is rotated as a unit with the turbine shaft 34 of the torque converter 14, and the driving power for running the vehicle forward is transmitted to the CVT 18. Since the forward-drive/reverse-drive switching device 106 is rotated as a unit in the forward drive mode that occurs most frequently, power loss that would be otherwise caused by rotation of meshing gears is avoided, and excellent energy efficiency can be achieved. Thus, the CVT 18 is designed so as to provide appropriate performance, based on the input torque applied to the CVT 18 during forward running of the vehicle.

When the shift lever is operated to the "R" position, the reverse-drive brake B2 is engaged and the forward-drive clutch C2 is released, so that the forward-drive/reverse-drive switching device 106 is placed in a reverse drive mode in which the input shaft 36 of the CVT 18 is rotated in a direction opposite to the rotating direction of the turbine shaft 34, and the driving power for running the vehicle backward is transmitted to the CVT 18. When the shift lever is operated to the "N" position, the forward-drive clutch C2 and the reverse-drive brake B2 are both released, and the forward-drive/reverse-drive switching device 106 is placed in a neutral (cut-off) mode in which power transmission is cut off.

In the meantime, the gasoline engine 104 and the diesel engine 12 have different output characteristics. More specifically, the gasoline engine 104 provides the maximum power at a relatively high engine speed, as indicated by a solid line in FIG. 5 by way of example, whereas the diesel engine 12 provides the maximum power at a lower engine speed than the gasoline engine 104, as indicated by a one-dot chain line in FIG. 5. Assuming that the maximum power is at the same level, the maximum torque of the diesel engine 12 is generally greater than that of the gasoline engine 104. If the diesel engine 12 is installed in place of the gasoline engine 104 in the vehicular driving system 102 of FIG. 4, therefore, the belt clamping force of the CVT 18 becomes insufficient, which may cause slippage of the belt, or the like. In this case, a large-sized belt-and-pulley type CVT 18 needs to be employed.

Figure 5:
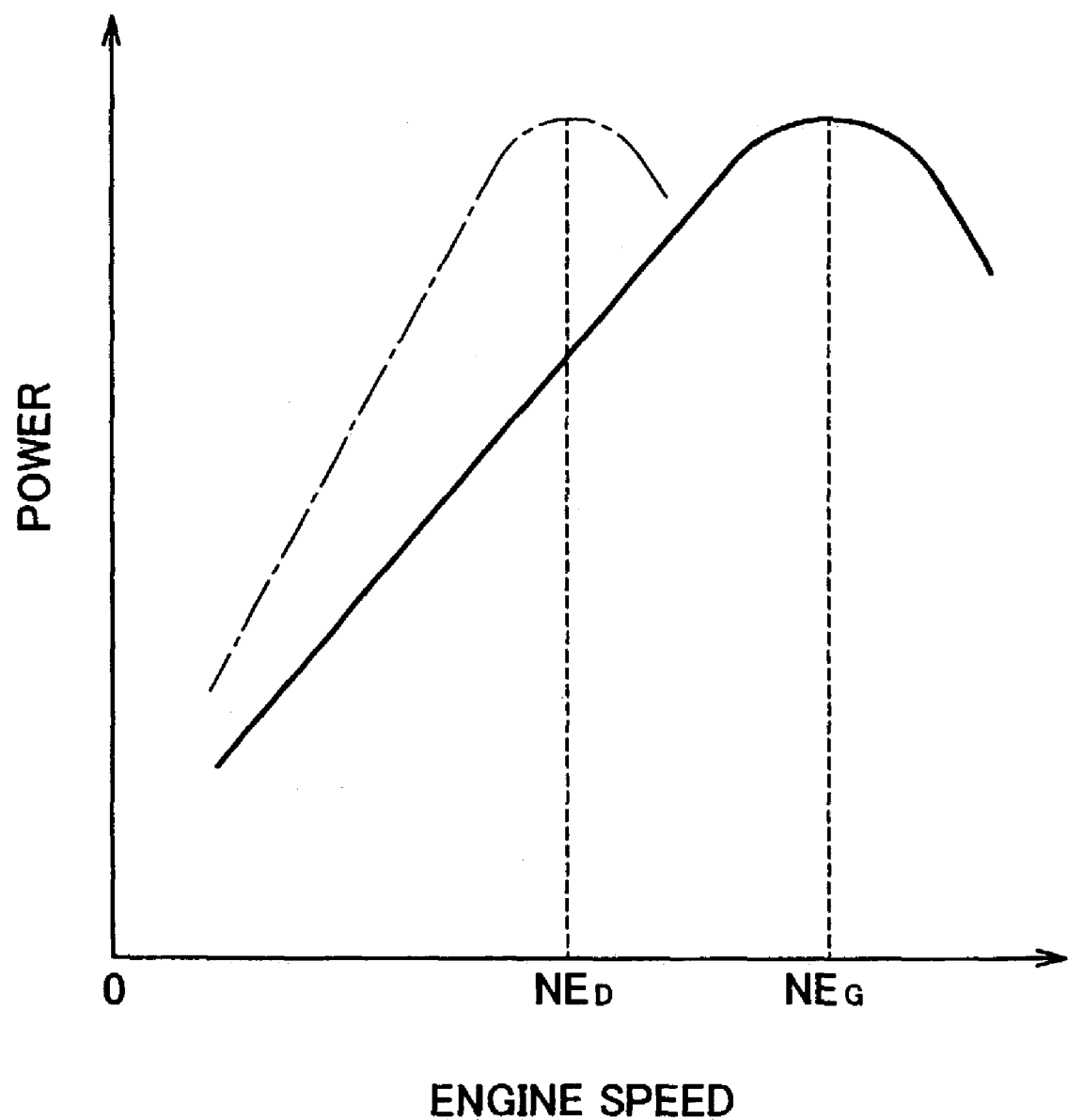
FIG. 5 is a graph showing output characteristics of a gasoline engine and a diesel engine for comparison.

In contrast, the vehicular driving system 10 of the present embodiment is provided with the forward-drive/reverse-drive switching device 16 and the auxiliary speed changing device 15 for increasing the speed of rotation during forward running of the vehicle. With the driving system 10, the rotary power of the diesel engine 12 is transmitted to the CVT 18 with its speed being changed. Thus, the belt-and-pulley type CVT 18 used in the vehicular driving system 102 of FIG. 4 can be also used in the vehicular driving system 10 without being modified. Namely, the CVT 18 can be used as it is in the driving system 10 if the total speed ratio a (=rotational speed NT of the turbine shaft 34/rotational speed NIN of the input shaft 36) of the auxiliary speed changing device 15 and the forward-drive/reverse-drive switching device 16 is set so that the maximum torque applied from the diesel engine 12 to the CVT 18 becomes substantially equal to or smaller than the maximum torque that would be applied from the gasoline engine 104 to the CVT 18 in the vehicular driving system 102 of FIG. 4. In the case where the gasoline engine 104 and the diesel engine 12 exhibit output characteristics as shown in FIG. 5, for example, the speed ratio a is set so as to satisfy the following expression (1), which uses rotational speed $NE_G$ at which the gasoline engine 104 provides the maximum power, and rotational speed $NE_D$ at which the diesel engine 12 provides the maximum power. Since the speed ratio a is expressed by the following expression (2) using the gear ratios ρ1 and ρ2, the gear ratios ρ1 and ρ2 are adequately determined so as to satisfy the equation (1). It is to be understood from the expression (1) that the speed ratio a is smaller than 1, and rotary power of the diesel engine 12 is transmitted to the CVT 18 while its speed being increased.

In the present embodiment, the auxiliary speed changing device 15 and the forward-drive/reverse-drive switching device 16 constitute a speed changing mechanism.

$$a \approx NE_D/NE_G \quad (1)$$

$$a = \rho2 \cdot (1-\rho1)/\rho1 \quad (2)$$

In the vehicular driving system 10 of the present embodiment, the speed changing mechanism (i.e., the auxiliary speed changing device 15 and the forward-drive/reverse-drive switching device 16) for increasing the speed of rotation of the diesel engine 12 during forward running of the vehicle is provided between the diesel engine 12 and the belt-and-pulley type CVT 18, for reducing the torque of the diesel engine 12 and transmitting the reduced torque to the CVT 18. Thus, the size of the CVT 18 used in the vehicle in which the diesel engine is installed can be made substantially as small as that of the CVT 18 used in the vehicle in which the gasoline engine is installed, and power loss due to large belt clamping force can be reduced, thus assuring improved fuel economy.

The auxiliary speed changing device 15 and the forward-drive/reverse-drive switching device 16 may suffer from power loss caused by rotation of meshing gears of the planetary gear sets during forward running of vehicle. However, the power loss is smaller than that arising in the case where a large-sized belt-and-pulley type CVT is employed in view of the increased torque of the diesel engine 12. Thus, the overall power loss of the driving system 10 can be reduced.

Furthermore, the speed ratio a of the speed changing mechanism is determined so that the maximum torque applied from the diesel engine 12 to the CVT 18 becomes substantially equal to or smaller than the maximum torque applied from the gasoline engine 104 to the CVT 18. Accordingly, the CVT 18 that is designed to provide appropriate performance when receiving the power of the gasoline engine 104 as it is as in the vehicular driving system 102 of FIG. 4 can be used without being modified in the diesel-engine vehicle of FIG. 1, which leads to reduction in the manufacturing cost as a whole.

In the present embodiment, the speed changing mechanism consists of the auxiliary speed changing device 15 and the forward-drive/reverse-drive switching device 16, and is thus provided with a forward-drive/reverse-drive switching function. Thus, the driving system is relatively simple in construction and is available at a reduced cost, as compared with the case where a speed changing mechanism and a forward-drive/reverse-drive switching device are provided independently of each other.

While the preferred embodiment of the invention has been described in detail with reference to the drawings, the invention is not limited to the details of this particular embodiment, but may be otherwise embodied with various changes, modifications and improvements which would occur to those skilled in the art, without departing from the scope of the invention.

What is claimed is:

1. A driving system of a motor vehicle, comprising:
a driving power source that generates power;
a belt-and-pulley type continuously variable transmission that transmits the power received from the driving power source to a drive wheel while changing a first speed of rotation of an input shaft thereof to a second speed of rotation of an output shaft thereof;
a forward-drive/reverse-drive switching device adapted to switch between forward drive and reverse drive; and
a speed changing mechanism connected in series with the forward-drive/reverse-drive switching device and comprising at least one planetary gear set and provided between the driving power source and the continuously variable transmission so as to increase or reduce a speed of rotation of the driving power source during forward running of the vehicle.

2. A driving system of a motor vehicle, comprising:
a driving power source that generates power;
a belt-and-pulley type continuously variable transmission that transmits the power received from the driving power source to a drive wheel while changing a first speed of rotation of an input shaft thereof to a second speed of rotation of an output shaft thereof; and
a speed changing mechanism provided between the driving power source and the continuously variable transmission so as to increase or reduce a speed of rotation of the driving power source during forward running of the vehicle, wherein the speed changing mechanism comprises at least one planetary gear set, and has a forward-drive/reverse-drive switching function of establishing a selected one of a cut-off mode in which power transmission is cut off, a forward drive mode in which the vehicle runs forward, and a reverse drive mode in which the vehicle runs backward, wherein:
the driving power source comprises a diesel engine; and
the speed changing mechanism transmits the power generated by the diesel engine to the continuously variable transmission while increasing a speed of rotation of the diesel engine during forward running of the vehicle, wherein:
speed ratio at which the speed changing mechanism changes the speed of rotation of the driving power source is determined so that a maximum torque applied from the diesel engine to the continuously variable transmission is substantially equal to or smaller than a maximum torque applied from a gasoline engine producing the same power as the diesel engine.

3. The driving system according to claim 1, wherein:
the driving power source comprises a diesel engine; and
the speed changing mechanism transmits the power generated by the diesel engine to the continuously variable transmission while increasing a speed of rotation of the diesel engine during forward running of the vehicle.

4. A driving system of a motor vehicle, comprising:
a driving power source that generates power;
a belt-and-pulley type continuously variable transmission that transmits the power received from the driving power source to a drive wheel while changing a first speed of rotation of an input shaft thereof to a second speed of rotation of an output shaft thereof; and
a speed changing mechanism provided between the driving power source and the continuously variable transmission so as to increase or reduce a speed of rotation of the driving power source during forward running of the vehicle, wherein:
the driving power source comprises a diesel engine; and
the speed changing mechanism transmits the power generated by the diesel engine to the continuously variable transmission while increasing a speed of rotation of the diesel engine during forward running of the vehicle, wherein:
a speed ratio at which the speed changing mechanism changes the speed of rotation of the driving power source is determined so that a maximum torque applied from the diesel engine to the continuously variable transmission is substantially equal to or smaller than a maximum torque applied from a gasoline engine producing the same power as the diesel engine.

* * * * *